May 30, 1961
W. H. WEBER
2,986,409
ALUMINUM SHEATH CABLE CONNECTOR
Filed May 2, 1958
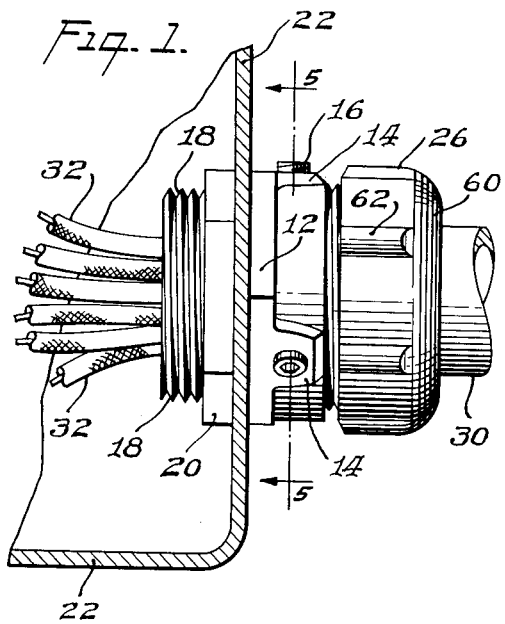
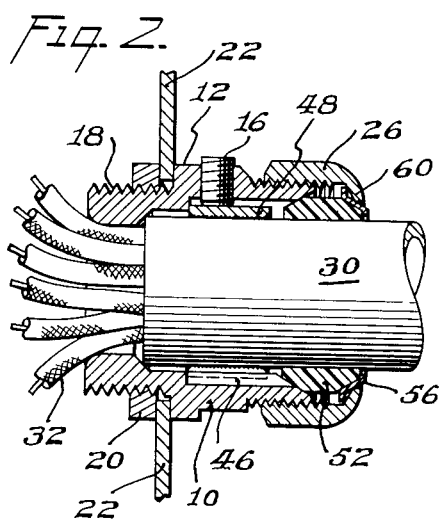
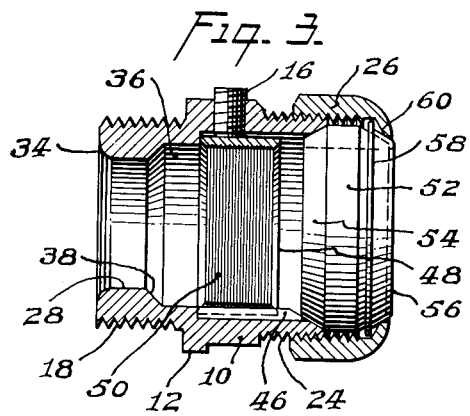
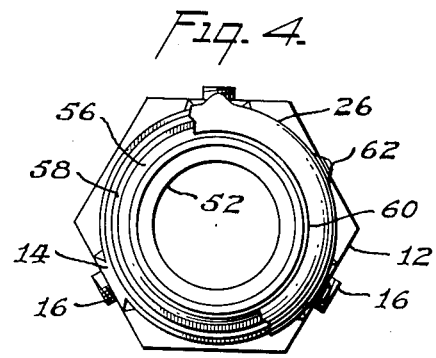
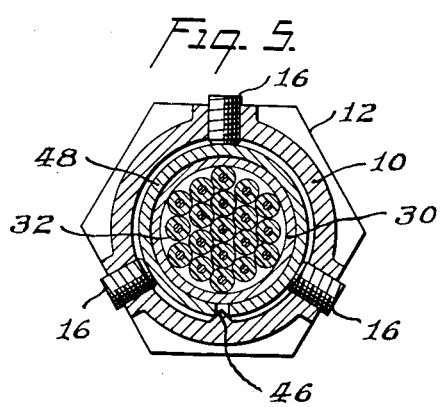
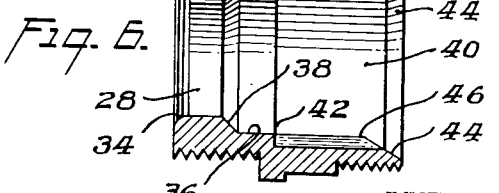
INVENTOR.
WALTER H. WEBER
BY *John Babis, Jr.*
ATTORNEY United States Patent Office 2,986,409
Patented May 30, 1961

2,986,409

ALUMINUM SHEATH CABLE CONNECTOR

Walter H. Weber, Metuchen, N.J., assignor to The Thomas & Betts Co., Elizabeth, N.J., a corporation of New Jersey Filed May 2, 1958, Ser. No. 732,650

2 Claims. (Cl. 285—161)

The invention relates to electric cable connector fittings generally, and more particularly to a connector fitting having a high resistance to heat and low resistance to ground which is adapted for effecting a moisture-sealed connection between a junction box or the like and an aluminum-sheathed, insulated electric cable.

More specifically, the invention resides in an aluminum connector fitting which includes an internal cable sheath clamping and grounding means, an entrance stop for engaging the intruded end of the cable sheath, integral means for preventing angular displacement of the clamping and grounding means relative to the connector fitting, and a gland nut including a compressible bushing for effecting a moisture seal between the cable sheath and gland nut.

The advent of insulated electric cables having an aluminum or other metallic protective sheath extruded or swaged thereon during the manufacture thereof has created a need for a connector fitting which is particularly adapted for effecting an approved, moisture-proof connection between a terminal end portion of such cables and a junction box or the like without impairing the cable sheath while effectively clamping, grounding and sealing the same by means of the connector fitting which is secured in a wall of a junction box in conventional manner. In accordance with the invention, this need has been satisfied by the connector fitting herein illustrated and described with respect to a preferred embodiment thereof.

Accordingly, it is an object of the invention to provide a connector fitting of the character described which is particularly adapted for terminating an aluminum-sheathed insulated electric cable in a conventional junction box or the like without impairing the same.

Another object of the invention is to provide a connector fitting of the character described which includes a cable sheath clamping and grounding member internally thereof.

A further object of the invention is to provide a connector fitting of the character described which is adapted, in each size thereof, to accommodate metal-sheathed insulated electric cables of varying outer diameters within a limited range.

Another object of the invention is to provide a connector fitting of the character described which is particularly adapted for high temperature applications, affords a water-tight seal about the metal sheath of an intruded cable portion, low resistance to ground and maximum clamping force on and about the intruded cable portion without impairing the same.

A further object of the invention is to provide a connector fitting of the character described in which an internal clamping and grounding is maintained against angular displacement relative to said connector fitting.

Another object of the invention is to provide a connector fitting as specified in which a clamping force is applied on an intruded metal-sheathed cable portion indirectly through an internal cable-gripping and grounding member by means of a plurality of adjustable elements disposed in and about the exterior of the connector fitting.

A further object of the invention is to provide a connector fitting as specified in which a resilient bushing, metal slip ring and gland nut are adapted to coact to form a water-tight seal on and about an intruded end portion of a metal-sheathed insulated electric cable.

With the above and other objects in view, the invention resides in the novel construction, combination and arrangement of parts, the novel features of which are set forth with particularity in the appended claims, the invention itself, however, both as to its organization and its method of operation, together with additional objects and advantages thereof, being best understood from the following description of a specific embodiment thereof when taken in connection with the accompanying drawings in which:

Fig. 1 is a view in elevation showing the novel connector fitting as secured in a knock-out opening in a wall of a conventional junction box with an end portion of metal-sheathed, insulated electric cable intruded and secured to the connector fitting;

Fig. 2 is a vertical sectional view through the assembly shown in Fig. 1;

Fig. 3 is a vertical sectional view through the connector fitting assembly per se;

Fig. 4 is an end view of the connector fitting assembly shown in Fig. 3;

Fig. 5 is a transverse sectional view taken on the line 5—5 of Fig. 1; and

Fig. 6 is a longitudinal sectional view of the tubular body member per se.

Referring to the drawing, the novel connector fitting for metal-sheathed electric cables comprises a tubular body member 10 in the form of an aluminum casting, for example, having an annular hexagonal flange 12, formed on the periphery thereof intermediate its opposite ends to form a shoulder thereon and for wrench application purposes, as will be understood. As best shown in Fig. 1, every other one of the flat surfaces defining the hexagonal flange 12 includes a laterally offset boss 14 which is drilled and tapped radially of the tubular member 10, in conventional manner for the reception of an adjustable hex-socket set-screw 16 for a purpose hereinafter described.

As clearly shown in Fig. 1, one end portion of the tubular body member 10 is provided with a reduced diameter suitably screw-threaded as at 18, to the shoulder formed by the hexagonal flange 12, for the reception of a lock-nut 20, whereby that end of the body member 10 is adapted to be secured in a knock-out opening provided in a wall of a conventional outlet or junction box 22, as will be understood. The opposite end portion of the tubular body member 10, having a slightly larger diameter, is also suitably screw-threaded, as at 24, for the reception of a gland or compression nut 26 of extruded aluminum, for example, as hereinafter described.

In accordance with the invention and as clearly shown in Fig. 6, the tubular body member 10 is provided with an axial bore, generally indicated at 28, which is substantially smaller in diameter, at one end thereof, than the diameter of a metal-sheathed electric cable 30 to be inserted therein, but of sufficient diameter to permit passage therethrough of a plurality of parallel insulated conductor end portions 32, constituting the core portion of the cable 30. The outer edge of the axial bore 28 is provided with a substantial radius, as at 34, to provide a smooth annular surface adapted to protect the insulation on the exposed conductor end portions 32, when brought into contact therewith.

As best shown in Fig. 6, the opposite inner end of the axial bore 28 opens into a short, intermediate counterbore 36 with an inclined annular shoulder 38 therebetween, the diameter of the intermediate counterbore 36 being such as to freely receive a terminal end portion of the metal-sheathed cable 30 therein with the end face of its metal sheath in abutment with the inclined shoulder 38, whereby the intrusion of the cable into the tubular body member 10 is limited to a predetermined depth. The opposite end of the intermediate counterbore 36 opens into a relatively long cable clearance counterbore 40, inwardly of the setscrew 16, and defining a square shoulder 42 therebetween, the counterbore 40 terminating at the opposite end of the body member 10, in an end face inclined inwardly at an angle of thirty degrees, as indicated at 44.

Further in accordance with the invention, the clearance counterbore 40 includes a raised spline or key 46 formed integral with its peripheral surface and extending lengthwise thereof substantially throughout its length, the spline or key 46, extending midway between the inner ends of two of the set-screws 16, disposed radially of the clearance counterbore 40, for a purpose now to be described.

Further in accordance with the invention, a split cable clamping sleeve 48 having an outer diameter smaller than the diameter of the clearance counterbore 40, an inner diameter adapted to receive the intruded end portion of the cable 30 therethrough in close-fitting relation, and a width substantially less than the length of the said counterbore 40, is seated therein with the spline or key 46 disposed between the spaced ends of the split sleeve 48, whereby relative rotation of the clamping sleeve 48 is prevented.

The inner periphery of the split sleeve 48 is provided with parallel, annular V-grooves or otherwise suitably scored to provide a multilated or interrupted annular surface 50, adapted to bite into the metal sheath of the cable 26 when clamped thereon.

The split sleeve 48 is adapted to be clamped about the periphery of the metal-sheathed cable 30 in response to pressure exerted radially thereon by the adjustment of the set screws 16, as best shown in Fig. 1.

Further in accordance with the invention, the tubular body member 10 of the improved connector fitting includes a yieldable, non-metallic bushing 52 of silicone rubber or the like, for example, having an inner diameter such that it can be forced on the metal-sheathed cable 30, and an outer diameter slightly larger than the diameter of the clearance counterbore 40, the outer diameter at the opposite ends of the bushing 52 being beveled or tapered, as at 54, at an angle of thirty degrees for seating one end thereof on the inclined end face 44 of the clearance counterbore 40.

Further in accordance with the invention, a complementary, dished slip-ring 56 of sheet metal, having a straight outwardly extending annular flange 58 on one end thereof, is seated on the opposite tapered end 54 of the rubber-like bushing 52, and the compression or gland nut 26 threaded on the free end 24 of the tubular member 10, the compression nut 26 being provided at one end with an inwardly extending annular flange 60 having a portion of its inner face beveled or tapered at an angle complementary to the dished portion of the slip ring 56, and the remaining portion of its flange 60 adapted to engage the annular flange 58 of the slip-ring 56, whereby the rubber-like bushing 52 is axially compressed into moisture-sealing engagement with the inwardly beveled end face 44 of the counterbore 40, and with the intruded end portion of the metal-sheathed cable 26, as the compression or gland nut 26 is advanced on the threaded end portion 24 of the tubular body member 10, toward its intermediate hexagonal flange 12.

As best shown in Fig. 1, the compression or gland nut 26 of extruded aluminum, for example, includes a plurality of angular spaced, straight, parallel projections 62 which are struck out of the peripheral plane of the internally threaded aluminum shell, constituting the compression nut 26, whereby to provide for the non-slip engagement thereon of a wrench, suitable for the purpose, as will be understood.

In practice, the screw-threaded end 18 of the tubular body member 10 is secured in an apertured wall of an outlet box 22 or the like by means of the lock-nut 20. Thereafter, the setscrews 16 are adjusted outwardly, if necessary, until their inner ends are substantially flush with the peripheral surface defining the clearance counterbore 40 and the split-sleeve 48 positioned therein with the spline or key 46, within the counterbore 40, between the spaced ends of the split sleeve 48.

Thereafter, the compression or gland nut 26, the split-ring 56 and the rubber-like bushing 52 are assembled, in the order given, on an end portion of the metal-sheathed cable 30, to be intruded into the tubular body member 10, and the cable 30 then inserted into the counterbore 40 and through the split-sleeve 48, until the end face of the metal sheathing on the cable 30 is in abutment with the inclined annular shoulder 38 at the inner end of the reduced bore 28 in the opposite end portion of the tubular body member 10, and the set-screws 16 subsequently adjusted inwardly on the split-sleeve 48 to clamp the intruded cable end portion in final position with its exposed conductor end portions 32 extending through the tubular body member 10 into the outlet box 22.

After the intruded cable portion 30 has been so secured in the tubular body member 10, the compression or gland nut 26, including the slip-ring 56 and rubber-like bushing 52, are moved along the cable 30, toward the threaded end portion 24 of the body member 10 and the compression or gland nut 26 threaded thereon to close and moisture-seal the connection thus made between the tubular body member 10, the compression or gland nut 26, and the metal sheathing on the cable 30 by the axial compression of the rubber-like bushing 52 therebetween, as clearly illustrated in Figs. 1 and 2.

For the purpose of assuring accurate inspection of a completed connection when made between a metal-sheathed cable and a connector fitting as above descirbed, a rubber-like bushing 52, which is colored blue, for example, is utilized, and the opening in the slip-ring 56 made substantially larger in diameter than the diameter of the metal-sheathed cable 30, in order that a portion of the outer end of the rubber-like bushing 52 will be visible through the larger opening in the slip-ring 56 and thus indicate to an inspector or otherwise assure that the completed connection includes the rubber-like bushing 52 in accordance with the invention as herein illustrated and described.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claims.

I claim:

1. A cable connector fitting adapted for anchoring an end portion of a metal sheathed electric cable in an apertured wall of an outlet box comprising a tubular body member having a stepped axial bore therethrough forming an inclined annular shoulder adjacent one end thereof adapted for limiting the intrusion of a cable end portion therein, and an intermediate square annular shoulder of relatively larger diameter providing an abutment for a split annular sleeve disposed within said tubular body member, said split sleeve having its opposed faces substantially spaced apart and a normal inner diameter corresponding substantially to the outer diameter of a metal sheathed cable to be extended therethrough, a linear key of conical configuration in cross section integral with and projecting inwardly from the inner periphery of the opposite end portion of said tubular body member in parallelism with its axial center extending between the opposed spaced faces of said split sleeve preventing relative angular movement thereof, and a plurality of angularly spaced set-screws extending radially through said body member into engagement with said split sleeve for contracting said sleeve on an intruded cable end portion whereby said split sleeve and said cable end portion are secured in said tubular body member, the respective end portions of said body member being externally screw-threaded for receiving a lock nut on one end thereof, and a gland nut including a resilient bushing and slip ring on the other end thereof adapted for sealing said connector fitting about an intruded cable end portion.

2. A cable connector fitting adapted for anchoring an end portion of a metal sheathed electric cable in an apertured wall of an outlet box comprising a tubular body member having an externally screw-threaded reduced end portion provided with an axial bore having a peripherally rounded outer end, a counterbore opening into the inner end of said axial bore concentric therewith forming an inclined shoulder therebetween, said counterbore being adapted for receiving an intruded end of a metal-sheathed cable therein in abutment with said inclined shoulder, a second counterbore concentric with said first-named counterbore extending from the opposite end of said body member and defining a square shoulder at the inner end of said first-named counterbore, a split sleeve disposed in said second-named counterbore presenting spaced opposed faces and an annularly grooved inner periphery having a normal diameter corresponding substantially to the outer diameter of the sheathed cable to be extended therethrough, a linear key of inverted V configuration in cross-section integral with and projecting inwardly from the inner periphery of said second-named counterbore in parallelism with its axial center extending between the opposed spaced faces of said split sleeve whereby to prevent relative angular movement thereof, said tubular body member having a hexagonal flange intermediate its ends including a plurality of angularly spaced bosses on said body member extending laterally from one side of said flange, a set-screw extending radially through each of said bosses and said body member into engagement with said split sleeve adapted to clamp said sleeve on said intruded cable end portion, the opposite end of said second-named counterbore having an inclined end face to form an angular seat for a tapered end of a rubber-like bushing including a slip ring, and an external screw-thread formed on the opposite end of said body member for receiving a gland nut thereon whereby to compress said bushing about said intruded cable end portion.

References Cited in the file of this patent

UNITED STATES PATENTS

| | | |
|---|---|---|
| 1,275,439 | Johnson | Aug. 13, 1918 |
| 1,410,600 | Roberts | Mar. 28, 1922 |
| 1,809,582 | Church | June 9, 1931 |
| 1,831,856 | Fullman | Nov. 17, 1931 |
| 1,983,977 | Geiger | Dec. 11, 1934 |
| 2,203,237 | Raybould | June 4, 1940 |
| 2,758,852 | Newell | Aug. 14, 1956 |

FOREIGN PATENTS

| | | |
|---|---|---|
| 730,339 | Great Britain | May 18, 1955 |